Patented July 13, 1937

2,086,683

UNITED STATES PATENT OFFICE 2,086,683

GAS TUBE CIRCUITS FOR MEASURING SHORT-LIVED IMPULSES

Leland Kasson Swart, Mountain Lakes, N. J., assignor to American Telephone and Telegraph Company, a corporation of New York Application April 16, 1936, Serial No. 74,794

2 Claims. (Cl. 175—320)

This invention relates to gas-filled tubes and to circuits for gas-filled tubes. More particularly, this invention relates to arrangements for measuring or recording voltages or currents and especially for measuring or recording short-lived impulses.

At times it becomes desirable to operate apparatus which may be mechanically slow from impulses which are of very short duration. The operation of such apparatus in response to short-lived impulses becomes unusually difficult where the only available source of potential is some low frequency alternating current potential such for example, as twenty-cycle ringing current.

The recording and measurement of short-lived impulses in locations where only low frequency alternating current is available may be accomplished by employing a gas-filled tube of, for example, the cold cathode type. By connecting the low frequency source of potential to the work circuit of the tube, it is necessary that the gas in the tube be brought into an ionized condition and remain ionized during the part of the cycle in which the applied voltage in the work circuit exceeds the voltage required to sustain the glow between the electrodes of the work circuit. Hence when voltages of very short duration are transmitted to the input electrodes of the tube, the apparatus will fail to operate unless the deionization time of the gas within the tube is so slow that the glow will persist for an appreciable length of time after it has started and thereby allow the voltage in the work circuit to build up to a required level.

Thus a tube of slow deionizing time can be started from short-lived impulses applied to its input circuit and the glow will persist until the voltage is built up during part of the cycle to such a value as to cause current to flow through the apparatus connected in the work circuit of the tube.

Figure 1:
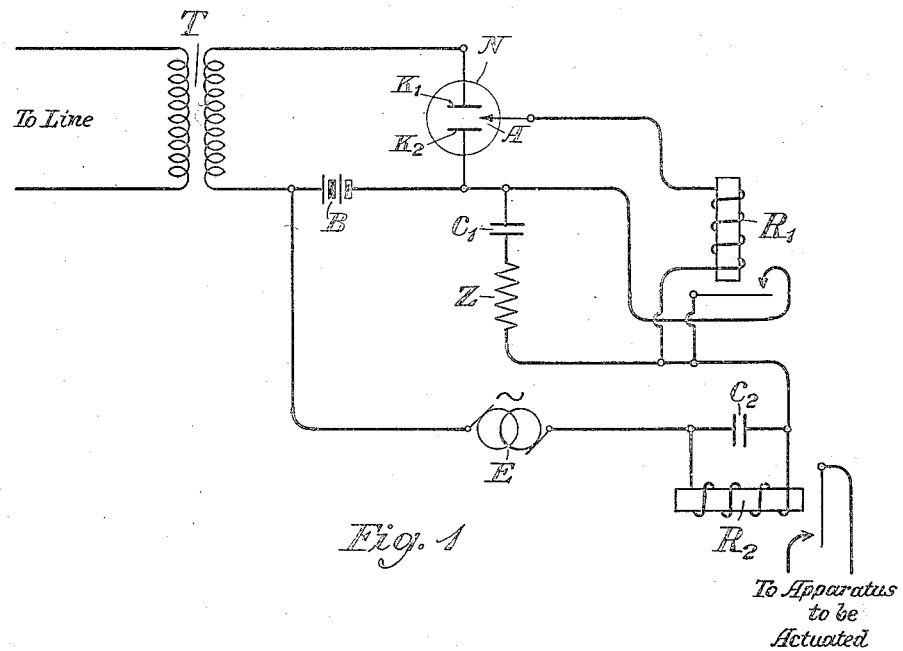
Figure 2:
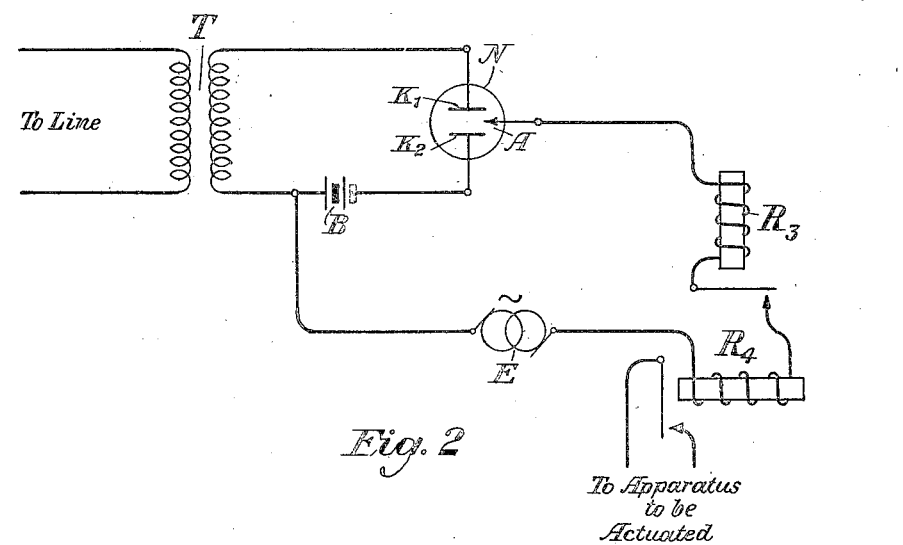

This invention will be better understood from the detailed description hereinafter following when read in connection with the accompanying drawing in which Figure 1 illustrates one embodiment of the invention employing a three-element cold cathode gas-filled tube and a source of low frequency current connected to its work circuit and Fig. 2 illustrates a modification of the arrangement shown in Fig. 1.

Referring to Fig. 1 of the drawing, the reference character T designates a transformer connecting a source of voltage of short duration (not shown) and the input electrode or cathodes $K_1$ and $K_2$ of a cold cathode gas-filled tube the enclosed gas of which has a slow deionizing time. A source of direct current potential, such as a battery B is inserted in the circuit of the input electrodes to bias one input electrode with respect to the other input electrode, and thus reduce the voltage required to ionize the gas between these electrodes (and thereby allow current to be discharged between these electrodes).

The anode A of tube N is connected to cathode $K_2$ through a circuit which includes the windings of relays $R_1$ and $R_2$, a source of low frequency alternating current E, which may be a ringing current generator, and the battery B. The relays $R_1$ and $R_2$ may be any slow operating relays well known in the art, but if desired a special type of slow operating relay may be here employed and this will be briefly described hereinafter. The circuit just traced may be termed the work circuit of the tube.

The anode A of tube N is also connected to cathode $K_2$ through the winding of relay $R_1$ and the armature and forward contact of the relay. A condenser $C_1$ and an impedance Z are connected in series relationship across the armature and forward contact of relay $R_1$ to absorb the "kick" potential produced upon the decay in the magnetic field within the winding of the relay caused by the withdrawal of current from that winding when the armature leaves the forward contact.

A condenser $C_2$ is shown connected across the winding of relay $R_2$. This condenser is not essential to the circuit and may be dispensed with, if desired. If employed, its purpose is to assist in maintaining the winding of relay $R_2$ sufficiently energized during the application of adequate voltage between electrodes $K_1$ and $K_2$ of tube N to maintain the armature of relay $R_2$ firmly closed against its contact.

Upon the application of a sufficient potential through transformer T to the cathodes or input electrodes $K_1$ and $K_2$ of tube N, the gas between these electrodes will become ionized and the tube will glow. This glow will be sustained for a period of time dependent upon the deionizing time or constant of the gas within the tube. Immediately after ionization is started and before deionization is completed, the voltage applied to the work circuit by generator E, if in excess of the sustaining voltage of the tube, as it will be during part of the cycle, will cause currents to flow through the windings of relays $R_1$ and $R_2$, and these relays will become operated. The armature and contact of relay $R_2$ will close the circuit of the apparatus to be actuated. However, the closure of the armature of relay $R_1$ against its contact will cause the generator E to be shunted through the armature and contact of relay $R_1$ around this relay's winding and thereby effectively remove generator E from this relay winding.

During that interval in which relay $R_1$ remains operated, any potential previously applied to the anode A and cathode $K_2$ of the tube will be reduced to zero by the shunt circuit around these electrodes formed by the winding of relay $R_1$ and its armature and contact. The relay $R_1$ is of the slow-release type and is so designed that its armature will remain against its contact for an appreciable interval of time after withdrawal of potential from its winding. According to this invention, the armature of relay $R_1$ must remain against its contact for a period of time greater than the deionizing time of the gas in the tube in order that the tube be restored to normal and its glow extinguished. Immediately upon the extinction of the glow, however, the relay $R_1$ will release and relay $R_2$ will restore to normal.

In other words, a short-lived impulse of sufficient voltage will ionize the gas within tube N, then both relays $R_1$ and $R_2$ will be operated, then all potential will be removed from the electrodes A and $K_2$ of the tube, relay $R_1$ will release and finally relay $R_2$ will release. The relay $R_2$—the recording relay—will operate throughout an interval of time which corresponds to the duration of the applied impulse. It will be understood that if the applied impulse lasts longer than a brief interval, the relay $R_1$ will be repeatedly operated and released, but relay $R_2$ will remain operated for a corresponding duration.

Figure 2 is a modification of Fig. 1. Here the work circuit includes the anode A of tube N, the winding, armature and contact of relay $R_3$, the winding of relay $R_4$, the low frequency generator E, battery B and cathode $K_2$ of tube N. The relay $R_3$ is also of the slow release type. The back contact of relay $R_3$ will normally be closed and remain closed until after gaseous ionization has been initiated and until after relay $R_3$ has operated. Shortly after sufficient energy is applied to the winding of relay $R_3$, the armature of relay $R_3$ will open its back contact and this armature will remain away from its contact for a period of time in excess of the time required to deionize the gas within the tube.

A slow operating relay suitable for use in this invention may be constructed from the motor movement of ordinary electric clocks. Such a relay is of the motor type and its armature rotates and in rotating produces a forward motion of the shaft which opens or closes a contact. After the relay has opened or closed its contact the rotating motion stops and a reversal in the direction of rotation of the armature takes place in response to the action of a hair spring fastened to the motor shaft. Thus the relay restores itself to normal. Such a slow-operate type of relay may, if desired, be employed instead of any of the other types well known in the art, for carrying out the principles of this invention.

The three-electrode cold cathode gas tube described herein may be replaced by a tube of four or more electrodes. Moreover, the tube may be of the hot cathode or cold cathode type.

While this invention has been shown and described in certain particular embodiments merely for the purpose of illustration, it will be understood that the general principles of this invention may be applied to other and widely varied organizations without departing from the spirit of the invention and the scope of the appended claims.

What is claimed is:

1. Apparatus for recording short-lived impulses comprising a gas tube including an anode and a pair of other electrodes and enclosing a gas having a large deionization time constant, a slow-operating relay, a source of low frequency alternating current connected in series with the winding of the relay and the anode and one of the other electrodes of the gas tube, and a recording relay controlled by the first-mentioned relay.

2. The combination of a gas tube including an anode and a plurality of cathodes, a source of voltage to be applied to said cathodes, a plurality of relays one of which is of the slow operate type, a source of alternating current of low frequency connected in series with the windings of said relays and with the anode and one of said cathodes, said source of alternating current supplying no current to the windings of said relays when no substantial voltage is applied to said cathodes, and means including the contacts of one of said relays and responsive to the application of substantial voltage to said cathodes for supplying said alternating current to the windings of said relays.

LELAND KASSON SWART.